(12) United States Patent
Ruzon et al.

(10) Patent No.: US 9,542,765 B2
(45) Date of Patent: *Jan. 10, 2017

(54) METHOD AND SYSTEM FOR PLACING AN OBJECT ON A USER

(71) Applicant: A9.com, Inc., Palo Alto, CA (US)

(72) Inventors: Mark A. Ruzon, Mountain View, CA (US); Dmitriy Shirchenko, Berkeley, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/673,460

(22) Filed: Mar. 30, 2015

(65) Prior Publication Data

US 2015/0206334 A1    Jul. 23, 2015

Related U.S. Application Data

(63) Continuation of application No. 13/745,726, filed on Jan. 18, 2013, now Pat. No. 8,994,751, which is a (Continued)

(51) Int. Cl.
*G09G 5/14* (2006.01)
*G06T 11/60* (2006.01)
(Continued)

(52) U.S. Cl.
CPC .............. *G06T 11/60* (2013.01); *G06T 7/0042* (2013.01); *G06T 7/408* (2013.01); *G06T 7/60* (2013.01);
(Continued)

(58) Field of Classification Search
CPC ....................................................... G06T 11/60
(Continued)

(56) References Cited

U.S. PATENT DOCUMENTS 5,454,043 A    9/1995 Freeman
5,917,490 A    6/1999 Kuzunuki et al.
(Continued)

OTHER PUBLICATIONS

"Final Office Action dated Jul. 6, 2012", U.S. Appl. No. 12/380,157, Jul. 6, 2012.
(Continued)

*Primary Examiner* — Javid A Amini
(74) *Attorney, Agent, or Firm* — Hogan Lovells US LLP

(57) ABSTRACT

A method, system and computer program product for virtually placing an object on an image of a human appendage is provided. First, image boundaries are detected in the image of the appendage and converted into a set of line segments. A pair of line segments is evaluated according to a function that combines subscores of the pair of line segments to produce a score. The subscores of the line segments are computed based on various properties such as orientation difference, extent, proximity to the center of the image, bilateral symmetry, and the number of skin-colored pixels. A pair of line segments with the highest score is chosen as the appendage boundaries and is used to determine the position, orientation, and extent of the object. The image of the object is then transformed according to the determined parameters and combined with the image of the appendage to produce the desired result.

16 Claims, 13 Drawing Sheets

Related U.S. Application Data continuation of application No. 12/380,157, filed on Feb. 24, 2009, now Pat. No. 8,384,740.

(51) Int. Cl.
*G06T 7/00* (2006.01)
*G06T 7/60* (2006.01)
*G09G 5/377* (2006.01)
*G06T 7/40* (2006.01)

(52) U.S. Cl.
CPC .............. *G06T 7/608* (2013.01); *G09G 5/377* (2013.01); *G06T 2207/10024* (2013.01); *G06T 2207/20221* (2013.01)

(58) Field of Classification Search
USPC ......................................................... 345/632
See application file for complete search history.

(56) References Cited

U.S. PATENT DOCUMENTS

| | | | |
|---|---|---|---|
| 6,597,363 B1 | 7/2003 | Duluk et al. | |
| 7,206,437 B2 | 4/2007 | Kramer et al. | |
| 7,454,038 B1 | 11/2008 | Ruzon | |
| 7,524,061 B2 | 4/2009 | Yan et al. | |
| 7,555,157 B2 | 6/2009 | Davidson et al. | |
| 7,606,420 B1 | 10/2009 | Ruzon | |
| 7,706,606 B1 | 4/2010 | Ruzon et al. | |
| 7,779,355 B1* | 8/2010 | Erol ................... | G06F 17/30253 715/231 |
| 7,787,712 B2* | 8/2010 | Takahashi ............. | G06K 9/2054 358/1.17 |
| 7,802,184 B1* | 9/2010 | Battilana ............... | G06F 3/0236 715/256 |
| 7,949,191 B1 | 5/2011 | Ramkumar et al. | |
| 7,970,213 B1 | 6/2011 | Ruzon et al. | |
| 8,009,928 B1 | 8/2011 | Manmatha et al. | |
| 8,059,188 B2 | 11/2011 | Shingu et al. | |
| 8,115,772 B2 | 2/2012 | Ostermann et al. | |
| 8,115,774 B2 | 2/2012 | Biehn et al. | |
| 8,116,520 B2 | 2/2012 | Reinpoldt, III | |
| 8,384,740 B1* | 2/2013 | Ruzon ................... | G06T 7/0042 345/629 |
| 8,994,751 B1* | 3/2015 | Ruzon ................... | G06T 7/0042 345/632 |
| 9,204,170 B2* | 12/2015 | Smith ................... | H04N 19/176 |
| 9,240,077 B1* | 1/2016 | Kraft ........................ | G06T 11/60 |
| 9,280,560 B1* | 3/2016 | Dube ................. | G06F 17/30247 |
| 9,292,739 B1* | 3/2016 | Gray ................... | G06K 9/00456 |
| 2003/0147547 A1* | 8/2003 | Lin ........................ | G06T 1/0042 382/100 |
| 2004/0078285 A1 | 4/2004 | Bijvoet | |
| 2005/0270589 A1* | 12/2005 | Soeda ................. | H04N 1/4078 358/461 |
| 2005/0276486 A1* | 12/2005 | Withers ................. | H04N 19/50 382/232 |
| 2006/0092170 A1* | 5/2006 | Bathiche ................. | A63F 13/02 345/589 |
| 2006/0115176 A1* | 6/2006 | Kanamori ............... | G06T 5/003 382/266 |
| 2007/0003122 A1 | 1/2007 | Sirohey et al. | |
| 2007/0195612 A1* | 8/2007 | Brinson ................ | G06T 7/0012 365/233.12 |
| 2008/0219354 A1* | 9/2008 | Segall ................... | H04N 19/176 375/240.23 |
| 2009/0041365 A1* | 2/2009 | Meany .................... | H04N 19/48 382/248 |
| 2009/0222127 A1 | 9/2009 | Lind | |
| 2009/0285306 A1* | 11/2009 | Leonardi ................ | H04N 19/46 375/240.18 |
| 2010/0177966 A1 | 7/2010 | Ruzon et al. | |
| 2010/0183229 A1 | 7/2010 | Ruzon et al. | |
| 2010/0199257 A1* | 8/2010 | Biggerstaff ............... | G06F 8/76 717/104 |
| 2010/0205589 A1* | 8/2010 | Biggerstaff ............... | G06F 8/43 717/150 |
| 2011/0026832 A1 | 2/2011 | LeMoigne-Stewart et al. | |
| 2011/0164799 A1* | 7/2011 | Miao ..................... | G06T 11/006 382/131 |
| 2011/0243417 A1 | 10/2011 | Madabhushi et al. | |

OTHER PUBLICATIONS

"Non Final Office Action dated Mar. 5, 2012", U.S. Appl. No. 12/380,157, Mar. 5, 2012.

Dadgostar, F. et al., "Is the hand really quicker than the eye?", Variances of the Mean-Shift algorithm for real-time hand and face tracking, 2006, p. 58.

Jones, Michael J. et al., "Statistical Color Models with Application to Skin Detection", "Statistical Color Models with Application to Skin Detection" by Jones, Michael J. and James M. Rehg, International Journal of Computer Vision, 46: 1, pp. 81-96, Jan. 2002, Jan. 2002, 81-96.

Li, Yan et al., "Learning to Detect Boundaries in Natural Image Using Texture Cues and EM", Natural Computation, 2008. ICNC '08. Fourth International Conference on vol. 4 Digital Object Identifier: 10.1109/ICNC.2008.233, 2008, pp. 167-171.

Martin, D.R. et al., "Learning to detect natural image boundaries using local brightness, color and texture cues", Pattern Analysis and Machine Intelligence, IEEE Transactions on, vol. 26, Issue: 5 Digital Object Identifier: 10.1109/ TPAMI.2004.1273918, 2004, pp. 530-549.

Meulemans, P. et al., "Correcting velocity measurements by tracking of linear features", Motion Analysis and Tracking; Ref No. 1999/103, IEE Colloquium on Digital Object Identifier:10.1049/ic:19990580, 1999, pp. 10/1-10/6.

Stahl, Joachim S. et al., "Convex Grouping Combining Boundary and Region Information", Proceedings of the Tenth IEEE International Conference on Computer Vision (ICCV'05), 2005, 8 pages.

"Notice of Allowance dated Oct. 9, 2013" U.S. Appl. No. 13/745,726.

* cited by examiner

METHOD AND SYSTEM FOR PLACING AN OBJECT ON A USER

CROSS-REFERENCES TO RELATED APPLICATION

This application is a continuation of U.S. patent application Ser. No. 13/745,726, filed Jan. 18, 2013, entitled "Method and System for Virtually Placing a Tangible Item On An Appendage," which is a continuation of U.S. patent application Ser. No. 12/380,157, filed Feb. 24, 2009, entitled "Method and System for Virtually Placing a Tangible Item On An Appendage," each of which is incorporated by reference herein for all purposes.

BACKGROUND OF THE INVENTION

The invention relates generally to the field of digital image processing. More specifically, the invention relates to a method and system for virtually placing an object on an image of a human appendage.

Technology has long existed to select parts of two images and combine them together into a single image. An interesting use of this technology is to virtually try on a piece of jewelry without visiting a physical store. A person can use existing technology to combine an image of a piece of jewelry (a wristwatch, a bracelet, a necklace, etc.) with a picture the person takes of the appropriate body part.

Carrying out this process, however, is cumbersome. The image of the object must be retrieved and stored on a computer. An image of the body part must be taken and also stored on the computer. The images have to be loaded into a computer program that allows general-purpose image manipulation. A configuration of the object, consisting of its angle of rotation, size, and position, generally must be estimated. The images must then be combined correctly and the result displayed.

With the widespread usage of mobile phones with cameras, the process is potentially much simpler. A person takes an image of a body part on a mobile phone and sends it to a computer, where a human operator scans the image for a region that is skin-colored and is bounded in part by two approximately parallel edges. The operator can use a specialized computer program to specify the proper configuration of the image of the object relative to the image of the body part. The image of the object is stored on the computer beforehand and can be obtained, for example, using a digital camera. The computer program transforms the image of the object according to the specified configuration, combines the images, and sends the result back to the person's mobile phone. However, this approach requires an expensive human operator, and if images are entering the system faster than the operator can process them, additional operators and expense will be required.

There exists a need for an automated method for overcoming the limitations mentioned above.

SUMMARY

An objective of the present invention is to provide a method, system and computer program product for virtually placing an object on an image of a human appendage.

An objective of the present invention is to provide a method, system and computer program product for estimating a configuration of an object relative to an image of a human appendage.

An objective of the present invention is to provide a method, system and computer program product for estimating the boundaries of a human appendage in an image.

Various embodiments of the present invention provide a method, system and computer program product for virtually placing an object on an image of a human appendage. First, image boundaries made up of sequences of connected pixels are extracted from the image of the appendage. The image boundaries contain boundaries of the appendage and/or boundaries of other objects. In addition, they may split or merge at various junctions. To simplify the computation, the image boundaries are transformed into a set of line segments, where a line segment approximates some subsequence of pixels in an image boundary that is straight. Finding the appendage boundaries is therefore reduced to finding a pair of approximately parallel line segments bounding a skin-colored region.

Thereafter one or more pairs of line segments are evaluated according to a scoring function. The scoring function is composed of subscores computed by measuring various properties of a pair of line segments, such as how close the line segments are to being parallel or how much of the region between the line segments is skin-colored. The pair of line segments that maximizes the scoring function is chosen as the appendage boundaries. From the appendage boundaries, a configuration comprising the position, orientation, and extent of the object is estimated. The configuration is represented as a line segment perpendicular to and between the appendage boundaries.

Once the configuration has been estimated, the image of the object is transformed so that its configuration is the same as the estimated configuration. The transformed image is then combined with the image of the appendage to produce the desired output image.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

Skilled artisans will appreciate that the elements in the figures are illustrated for simplicity and clarity to help improve understanding of the embodiments of the present invention.

DETAILED DESCRIPTION OF THE INVENTION

While the embodiments of the invention have been described, the invention is not limited to these embodiments only. A number of changes and modifications can be considered without moving away from the scope of the invention, as set forth in the claims.

Various embodiments of the present invention relate to a method, system and computer program product for virtually placing an object on an image of a human appendage. The method first extracts image boundaries, which are sequences of connected pixels, from the image of the appendage. The image boundaries are transformed into a set of line segments, where a line segment approximates a subsequence of pixels in an image boundary that is straight. One or more pairs of line segments are evaluated according to a scoring function, which is composed from a set of subscores. A subscore is computed from a measurement of one or more properties of a pair of line segments.

Examples of subscores include, but are not limited to, an orientation subscore, an extent subscore, a center subscore, a symmetry subscore, and a skin subscore. The orientation subscore measures how close the line segments are to being parallel. The extent subscore measures how far apart the line segments are relative to the size of the image of the appendage. The center subscore is computed based on how close the pair of line segments is to the center of the image of the appendage. The symmetry subscore compares the orientation of the pair of line segments to the orientation of a line connecting the midpoints of the pair of line segments. Finally, the skin subscore measures the number of skin-colored pixels inside a region defined by the pair of line segments.

The pair of line segments with the highest score becomes the appendage boundaries. From the appendage boundaries a configuration is estimated by calculating a new line segment that is perpendicular to the appendage boundaries and lies between the appendage boundaries. The estimated configuration is then used to apply the proper amount of rotation, scaling, and translation to the image of the object so that the main axis of the object coincides with the calculated line segment. The transformed image of the object is then combined with the image of the appendage to form the result image.

Figure 1:
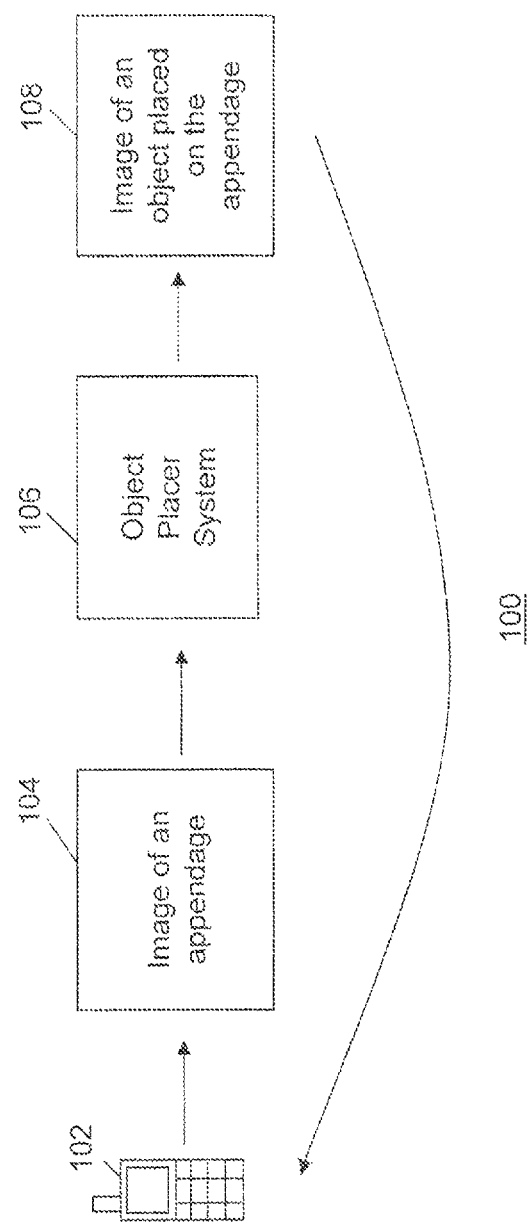
FIG. 1 illustrates an exemplary environment in which various embodiments of the present invention can be practiced.

FIG. 1 illustrates an environment 100 where various embodiments of the present invention can be practiced. Environment 100 includes a communication device 102 capable of sending images to a remote server. In one embodiment of the present invention, communication device 102 is a mobile phone. However, other computing devices such as personal computers connected to the Internet may also be used. Communication device 102 can be used to send an image of an appendage 104 to a computer containing an Object Placer System (OPS) 106 for virtually placing objects on images of human appendages. Examples of the human appendage include, but are not limited to, a wrist, an arm, a hand, a leg, an ankle, a foot, a torso and a neck. The specific object may be chosen by sending image 104 to an address dedicated to a particular object, or the choice may be specified explicitly by the user. OPS 106 then places an image of an object onto image 104 to produce an image 108 of the object placed on the appendage. Image 108 is then sent back to communication device 102. If OPS 106 is unable to determine the appendage boundaries, a failure response is sent to communication device 102.

Figure 2:
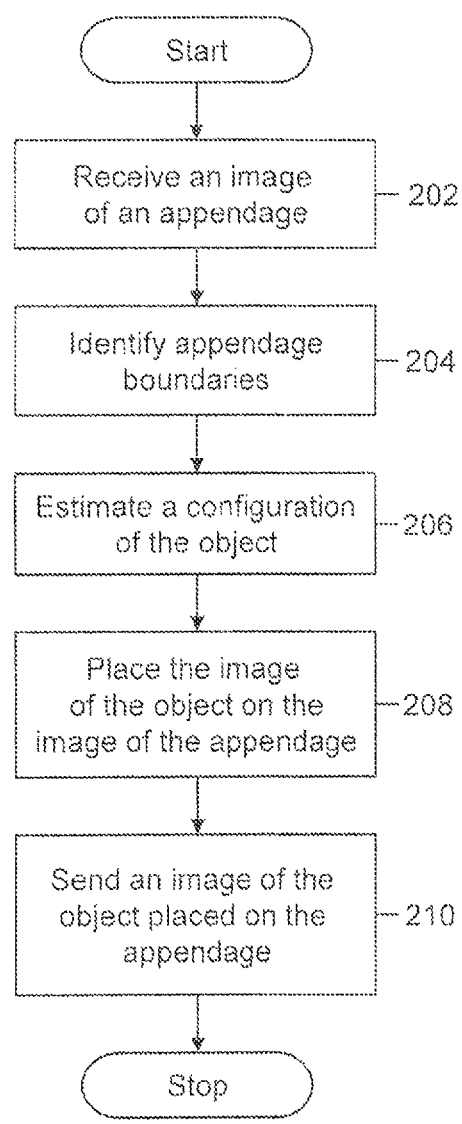
FIG. 2 is a flow diagram illustrating a method for placing an image of an object on an image of an appendage, in accordance with an embodiment of the invention.

FIG. 2 is a flow diagram illustrating a method for placing an image of an object on an image of an appendage, in accordance with an embodiment of the present invention. FIG. 2 gives a brief overview of the main steps that are performed by OPS 106 on an image of an appendage 104 for placing an image of an object on it.

At step 202 an image of an appendage 104 is received. At step 204 the appendage boundaries are determined. The process of determining the appendage boundaries is described in detail in conjunction with FIG. 3. Once the appendage boundaries have been determined, a configuration of the object is estimated at step 206. The configuration consists of the position, orientation, and extent of the object and is represented by a line segment. The process of estimating a configuration is described in detail in conjunction with FIG. 9.

At step 208 the image of the object is placed on the image of the appendage. Since the object is usually not rectangular, it is desirable to create an alpha map to mark the pixels in the image of the object that are part of the object and the pixels in the image of the object that are part of the background. Optionally, fractional alpha values may be assigned to pixels that contain both the object and the background to produce a more realistic effect. Once the configuration of the object is estimated, both the image of the object and the alpha map are rotated and scaled. The rotated and scaled image of the object is then blended into the image of the appendage at a position determined by the translation component of the configuration according to the values of the rotated and scaled alpha map. The blended image becomes the image 108 of the object placed on the appendage. Image 108 is then sent to a destination in step 210.

Figure 3:
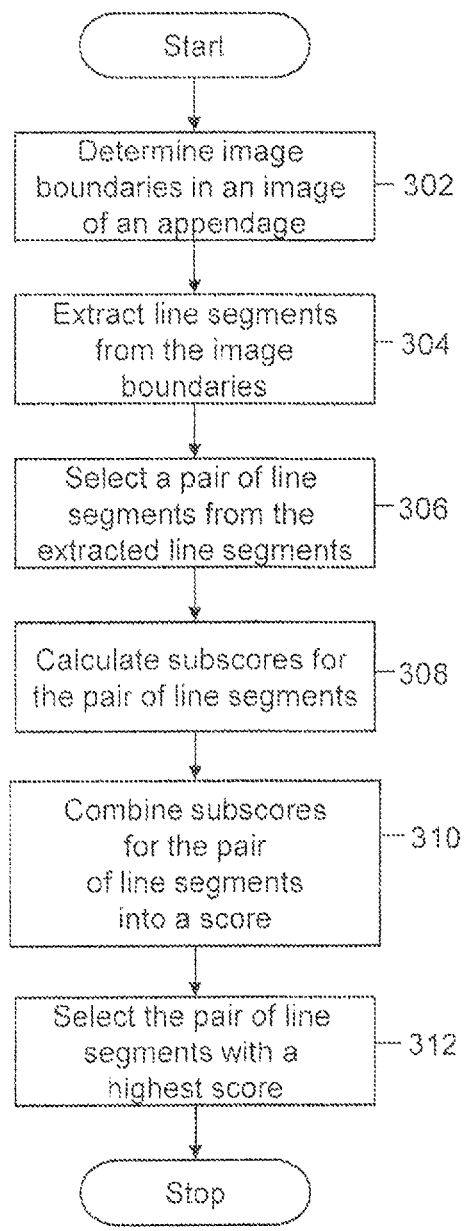
FIG. 3 is a flow diagram illustrating a method for identifying one or more boundaries of the appendage in the image of the appendage, in accordance with an embodiment of the invention.

FIG. 3 is a flow diagram illustrating the detailed steps of the process of determining the appendage boundaries in the image of the appendage in step 204. In step 302, image boundaries in the image of the appendage are determined. In one embodiment of the invention, image boundaries are found by applying the Canny edge detector to the image of the appendage. An image boundary is represented as a sequence of connected pixels. Because of the potential presence of other objects, as well as shadows or highlights on the appendage itself, the image boundaries may turn sharply, split or merge at various junctions, or even form loops. A single image boundary may contain part of the appendage boundary and part of the boundary of another object. Arbitrary image boundaries are difficult to use because computing the orientation of such an image boundary or computing the distance between two image boundaries is ill-defined.

Therefore, it is simpler to extract a set of line segments from the image boundaries according to step 304. A line segment is created from a subsequence of connected pixels in an image boundary that is approximately straight. In an embodiment of the present invention, a line segment is the longest subsequence of pixels such that the maximum distance between the line segment calculated using a least squares fit of the subsequence and a pixel in the subsequence is lower than a predefined threshold, such as 3 pixels.

In step 306, a pair of line segments is selected from the set of line segments. If the set does not contain at least two line segments, the computation is terminated. In an embodiment of the present invention, all pairs of line segments are successively chosen, with the computation described below (steps 308 and 310) being performed repeatedly.

In step 308, subscores are calculated for the selected pair of line segments. In an embodiment of the present invention, the orientation subscore, the extent subscore, the center subscore, the symmetry subscore, and the skin subscore are computed. A subscore is the result of a function applied to the measurement of one or more properties of a pair of line segments such as orientation difference, extent, proximity to the center of the image, bilateral symmetry, and the number of skin-colored pixels. The computation of the subscores is described in greater detail in conjunction with FIGS. 4-8. Some measurements of the one or more properties may result in the pair of line segments being discarded, in which case further measurements are not taken.

In step 310 the subscores are combined into a score for the pair of line segments. In an embodiment, the score is a function of at least one of an orientation subscore, an extent subscore, a center subscore, a symmetry subscore and a skin subscore. In an embodiment of the present invention, the score is computed by multiplying the subscores together. In step 312 the pair of line segments with a highest score is selected and determined to be the appendage boundaries.

Figure 4:
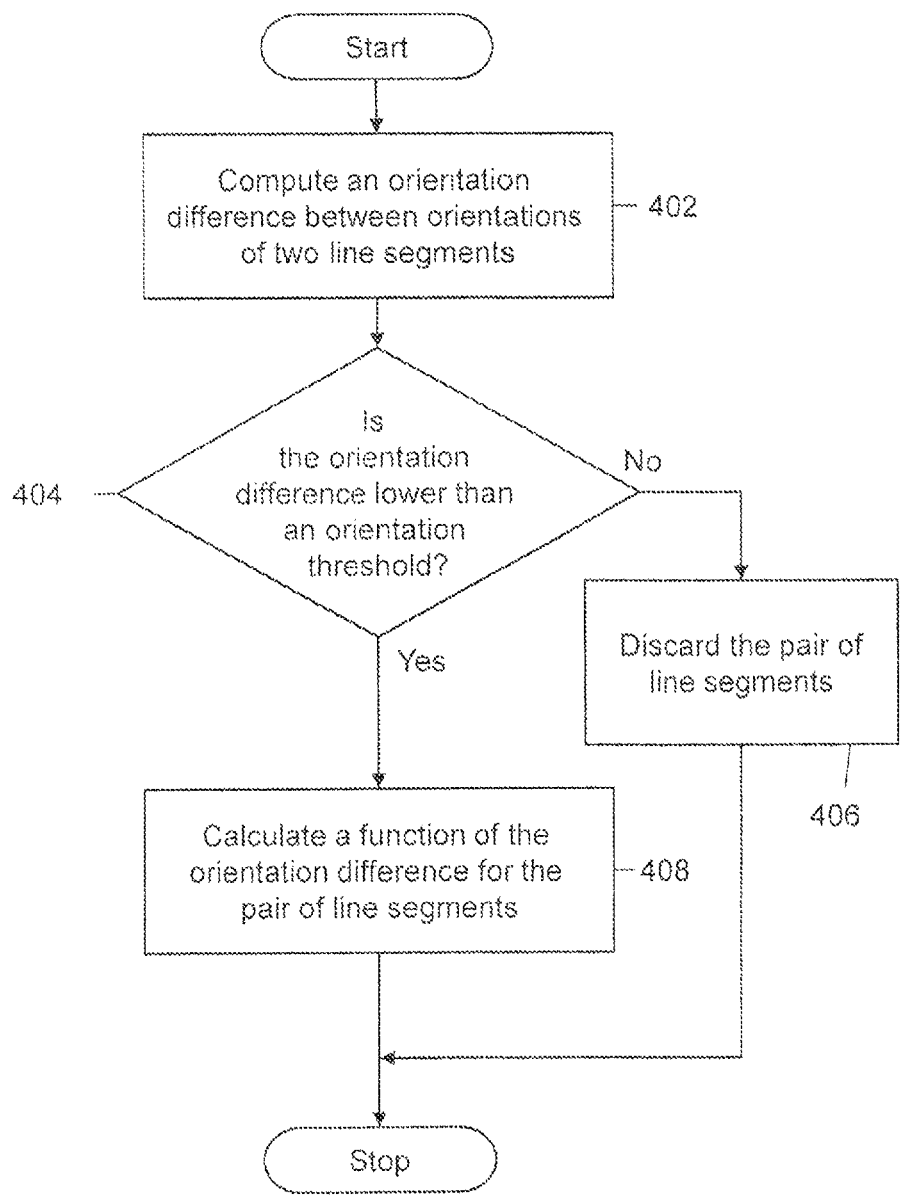
FIG. 4 is a flow diagram illustrating a method for calculating an orientation subscore for a pair of line segments, in accordance with an embodiment of the invention.

FIG. 4 is a flow diagram illustrating the computation of the orientation subscore for a pair of line segments. The orientation subscore indicates how close the two line segments are to being parallel. In step 402 an orientation difference between the line segments is computed. The orientation difference is computed by first computing the orientations of the line segments followed by computing the absolute value of the difference between the orientations of the line segments. Note that the "wraparound" effect (i.e. 0° and 180° are the same orientation) is preferably taken into account when computing the difference between the orientations of the line segments.

In step 404 the orientation difference is compared to an orientation threshold. In an embodiment of the present invention, the orientation threshold is 10°. If the orientation difference exceeds the orientation threshold, then the computation proceeds to step 406, where the pair of line segments is discarded. If the orientation difference is below the orientation threshold, the computation continues to step 408, where a function of the orientation difference is computed. In an embodiment of the present invention, the function is:

$$s_1 = G(d_1, 0, t_1),$$

where $G(x, \mu, \sigma)$ is a Gaussian function with mean $\mu$ and standard deviation $\sigma$ evaluated at x, $d_1$ is the orientation difference, and $t_1$ is the orientation threshold. The orientation subscore is $s_1$. Note that if the subscores are multiplied together to form the score, no normalization constant is required. In another embodiment of the present invention, the comparison of the orientation difference to the orientation threshold is included in the function of the orientation difference:

$$s_1 = \begin{cases} G(d_1, 0, t_1) & d_1 \leq t_1 \\ 0 & \text{otherwise} \end{cases}.$$

Figure 5:
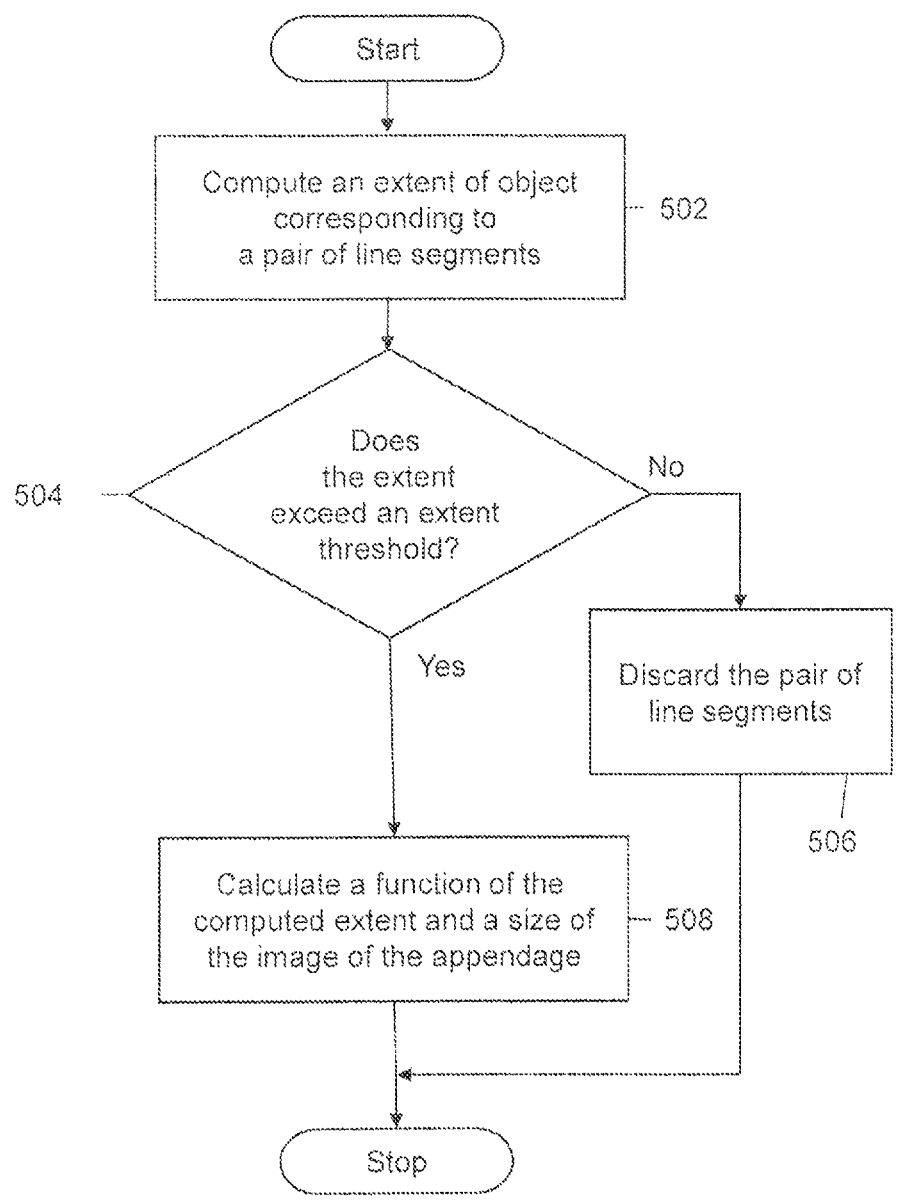
FIG. 5 is a flow diagram illustrating a method for calculating an extent subscore for a pair of line segments, in accordance with an embodiment of the invention.

FIG. 5 is a flow diagram illustrating the computation of the extent subscore for a pair of line segments. The extent subscore is computed from a measurement of the distance between the line segments. Based on experiments of people taking pictures of their own body parts, the function computing the extent subscore is designed to be large when the size of the object would be approximately half the height of the image and to be small when the object would be very large or very small. In step 502 an extent of an object that could be placed on the image of the appendage corresponding to the pair of line segments is computed. The extent of an object is computed using the procedure for estimating a configuration described in detail in conjunction with FIG. 9. In step 504, the extent is compared to an extent threshold. In an embodiment of the present invention, the extent threshold is 100 pixels. If the extent is smaller than the extent threshold, the pair of line segments is discarded, as shown in step 506. If the extent exceeds the extent threshold, the computation continues to step 508, where a function of the extent and size of the image of the appendage is computed. In an embodiment of the present invention, the function is:

$$s_2 = G\left(\frac{e_2}{t_2}, 1.5, 3\right),$$

where $e_2$ is the extent, $t_2$ is the extent threshold, and $s_2$ is the extent subscore. $s_2$ is maximized when the ratio $e_2/t_2$ is equal to the mean value of 1.5. In another embodiment of the present invention, the comparison of the extent to the extent threshold is included in the function of the extent:

$$s_2 = \begin{cases} G\left(\frac{e_2}{t_2}, 1.5, 3\right) & e_2 \geq t_2 \\ 0 & \text{otherwise} \end{cases}.$$

Note that very large extents, unlike very small extents, are still allowable using this function. However, the low value assigned to the extent subscore in this case effectively prevents a very large extent from being chosen unless there is no better alternative. A pair of line segments with a small extent may end up with a high score even though the appendage would have to be very far away from the camera.

Figure 6:
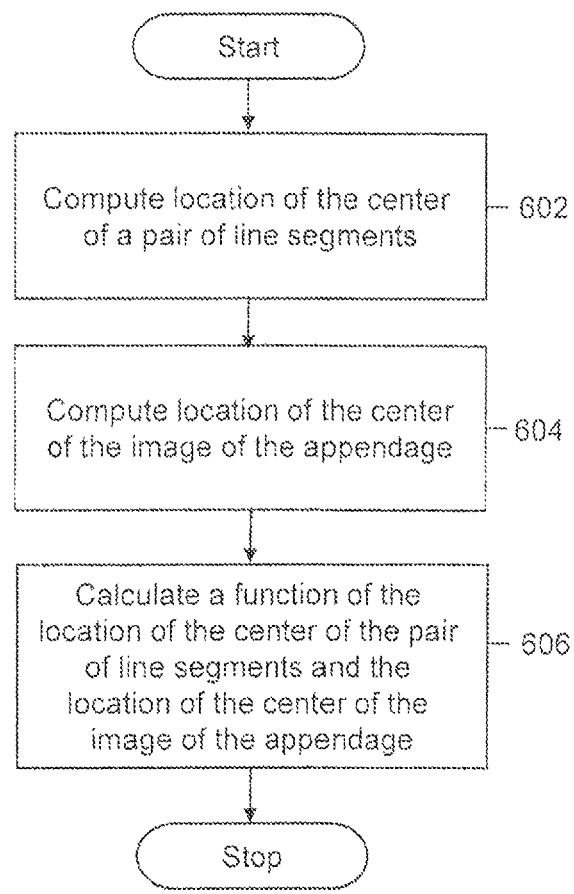
FIG. 6 is a flow diagram illustrating a method for calculating a center subscore for a pair of line segments, in accordance with an embodiment of the invention.

FIG. 6 is a flow diagram illustrating the computation of the center subscore for a pair of line segments. The utility of the center score is based on the assumption that the appendage is at or near the center of the image of the appendage. In step 602 a center of the pair of line segments is computed. The center of the pair of line segments is computed using the procedure for estimating a configuration described in detail in conjunction with FIG. 9. In step 604, a center of the image of the appendage is computed by halving the width and height of the image of the appendage. In step 606 a function of the center of the pair of line segments and the center of the image of the appendage is computed. In an embodiment of the present invention, the function is:

$$s_3 = 1 - \frac{\|c_3 - C_{im}\|}{\|C_{im}\|},$$

where $c_3$ is the center of the pair of line segments, $C_{im}$ is the center of the image of the appendage, and $s_3$ is the center subscore.

Figure 7:
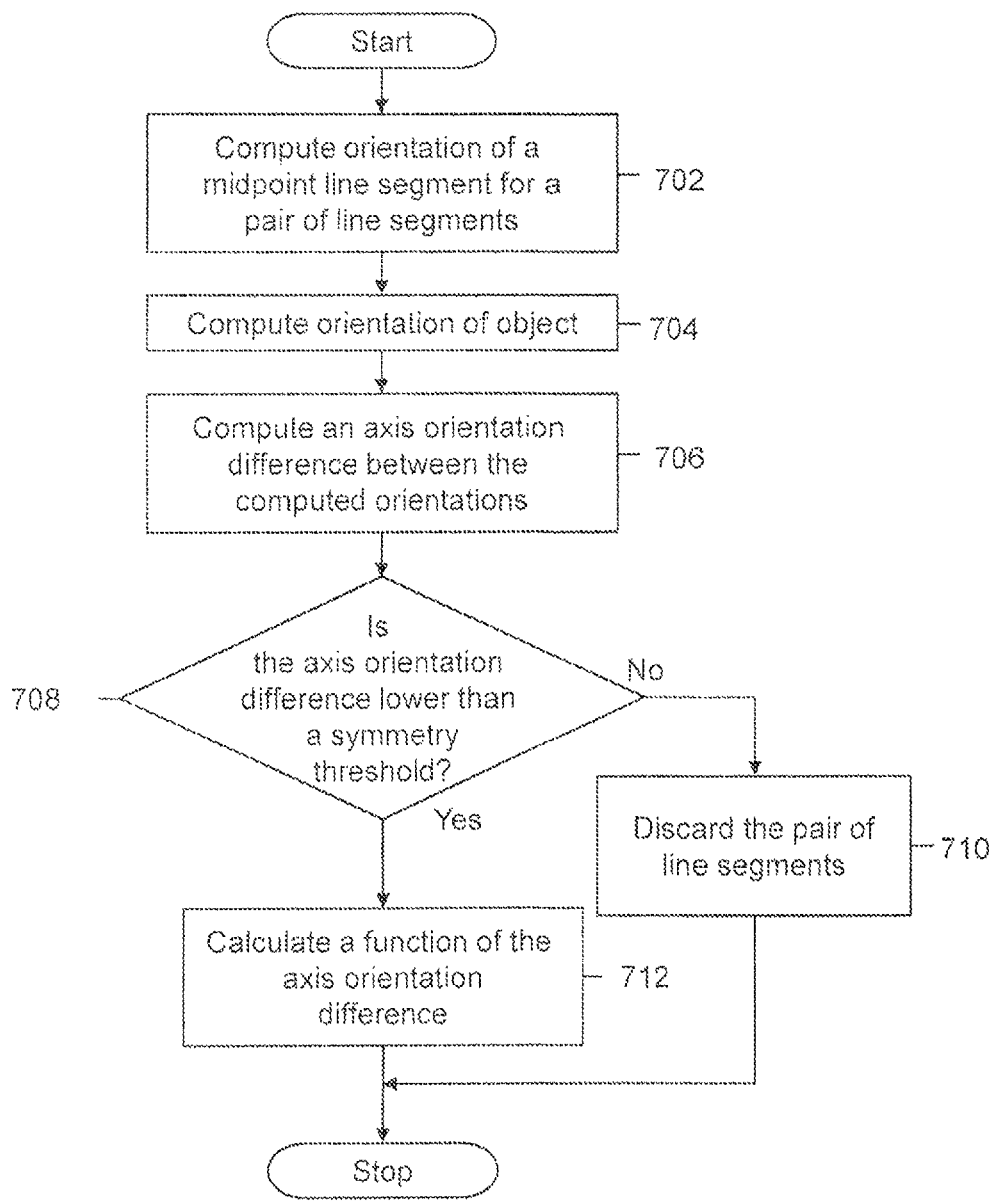
FIG. 7 is a flow diagram illustrating a method for calculating a symmetry subscore for a pair of line segments, in accordance with an embodiment of the invention.

FIG. 7 is a flow diagram illustrating the computation of a symmetry subscore for a pair of line segments. A pair of line segments has bilateral symmetry if a line bisecting the two line segments does so at right angles to the two line segments. Bilateral symmetry is an assurance that the two line segments are not on opposite sides of the image of the appendage. In step 702 the orientation of a midpoint line segment connecting the midpoints of the two line segments is computed. In step 704 the orientation of an object that could be placed on the image of the appendage corresponding to the pair of line segments is computed. The orientation of an object is computed using the procedure for estimating a configuration described in detail in conjunction with FIG. 9. In step 706 an axis orientation difference is computed between the orientation of the midpoint line segment and the orientation of the object. The wraparound effect discussed in step 402 is again preferably taken into account.

In step 708 the axis orientation difference is compared to a symmetry threshold. In an embodiment of the present invention, the symmetry threshold is 20°. If the axis orientation difference exceeds the symmetry threshold, the pair of line segments is discarded, as shown in step 710. If the axis orientation difference is lower than the symmetry threshold, the computation continues to step 712, where a function of the axis orientation difference is computed. In an embodiment of the present invention, the function is:

$$s_4 = \frac{90 - d_4}{90},$$

where $d_4$ is the axis orientation difference and $s_4$ is the symmetry subscore. In another embodiment of the present invention, the comparison of the axis orientation difference to the symmetry threshold is included in the function of the axis orientation difference:

$$s_4 = \begin{cases} \frac{90 - d_4}{90} & d_4 \le t_4 \\ 0 & \text{otherwise} \end{cases},$$

where $t_4$ is the symmetry threshold.

Figure 8:
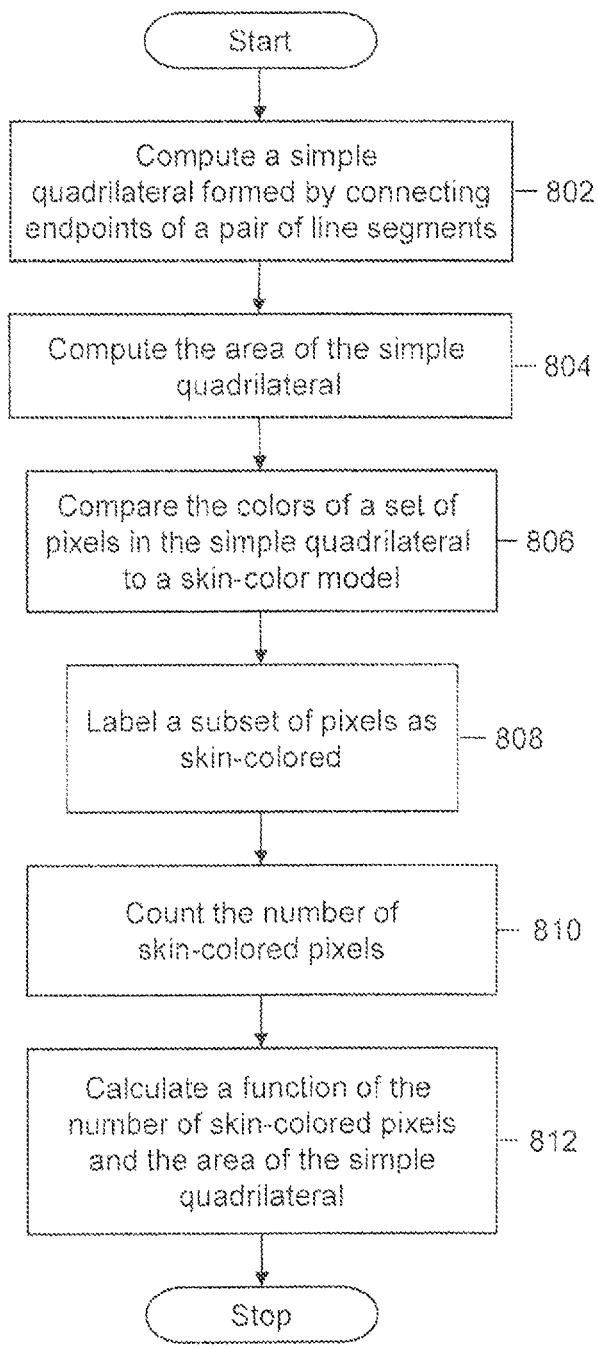
FIG. 8 is a flow diagram illustrating a method for calculating a skin subscore for a pair of line segments, in accordance with an embodiment of the invention.

FIG. 8 is a flow diagram illustrating the computation of the skin subscore for a pair of line segments. Since the present invention is concerned with human appendages, and since there is a high degree of similarity between skin colors of different people, even across ethnic groups, it is both desirable and computationally feasible that there be skin-colored pixels between the two line segments. In step 802 a simple quadrilateral is created by connecting the endpoints of the two line segments together. Note that if the endpoints are connected incorrectly, the resulting quadrilateral will not be simple. In step 804 the area of the simple quadrilateral is computed.

In step 806 the colors of a set of pixels in a region of the image of the appendage formed by the simple quadrilateral are compared to a skin color model. In accordance with one embodiment of the invention, the step 806 is done electronically. There are many different types of skin color models. In an embodiment of the present invention the skin color model is the Gaussian mixture model of Michael Jones and James Rehg. In step 808 a subset of pixels that satisfies the skin color model is identified and labeled as skin-colored pixels. In step 810 the number of skin-colored pixels in the region is determined by computing the cardinality of the subset, i.e. by counting the number of skin-colored pixels.

In step 812 a function of the area of the simple quadrilateral and the number of skin-colored pixels is computed. In an embodiment of the present invention, the function is:

$$s_5 = \frac{N}{A},$$

where N is the number of skin-colored pixels, A is the area of the simple quadrilateral, and $s_5$ is the skin subscore. Note that if the image of the appendage contains only shades of gray, and if the skin color model does not recognize any shade of gray as a skin color, then the skin subscore should be excluded from the computation. In an embodiment of the present invention, the skin subscore for any pair of line segments in a grayscale image is 1, the identity element for multiplication.

Figure 9:
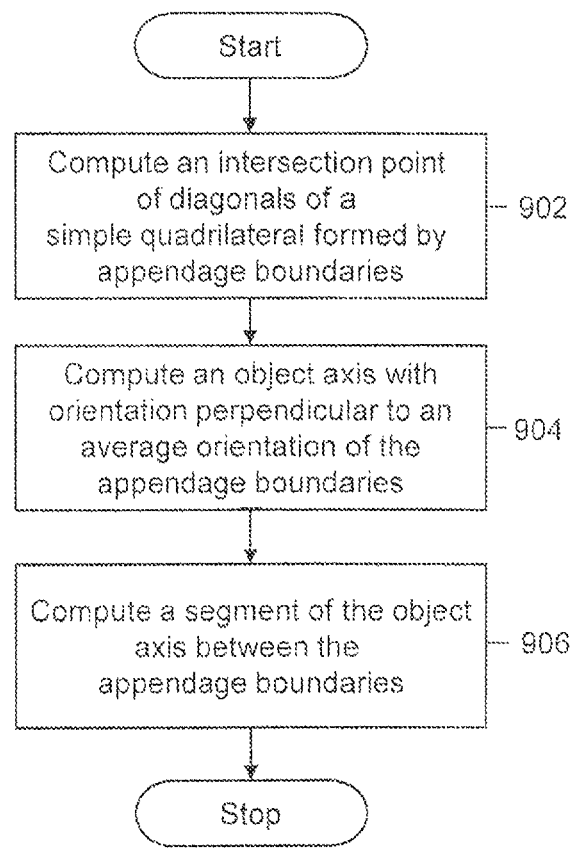
FIG. 9 is a flow diagram illustrating a method for estimating a configuration of the object, in accordance with an embodiment of the invention.

FIG. 9 is a flow diagram illustrating the computation for estimating a configuration of the object. This computation is applied to the appendage boundaries to determine the amount of rotation, scaling, and translation necessary to place the object on the appendage. It is also used on pairs of line segments during the computation of some subscores. In step 902 the intersection of the diagonals of the simple quadrilateral formed by connecting the endpoints of the appendage is computed. Note that because the orientation subscore computation and the symmetry subscore computation did not discard the appendage boundaries, it is assured that the diagonals do in fact intersect.

In step 904 an object axis is computed for the appendage boundaries. The object axis is defined as the line through the intersection of the diagonals computed in step 902 with orientation perpendicular to the average orientation of the appendage boundaries. As with computing orientation differences, computing the average orientation should preferably take the wraparound effect into account. Note that, since the range of valid orientations is only 180°, it is not possible send an image of an appendage that is rotated 180° from an original image and produce an image of the object placed on the appendage where the object appears upside-down. In both cases the object will appear to be right-side-up.

In step 906 a line segment is computed from the object axis. The line segment is defined as the segment of the object axis between the intersection points of the object axis and the appendage boundaries. Because the appendage boundaries are line segments, the lines corresponding to the appendage boundaries are used to guarantee that the intersections exist. The line segment is the estimated configuration of the object, as the orientation of the line segment encodes the amount of rotation, the length of the line segment encodes the extent, and the position of the line segment encodes the amount of translation necessary to place the image of the object on the image of the appendage.

In another embodiment of the present invention, the appendage is an ear. Because an ear is not bounded by two roughly parallel appendage boundaries, a different approach is desirable. Image boundaries found in an image of an ear are searched for a boundary that has significant curvature and is long relative to other image boundaries found in the interior of the ear. The chosen boundary becomes the ear boundary. The estimated configuration for this embodiment is a point representing the location of an earring to be placed on the image of the ear along with a size representing the distance from the point to the ear boundary. By fitting a circle to the lower portion of the ear boundary, the center and radius of the circle can be determined and the configuration estimated.

Figure 10:
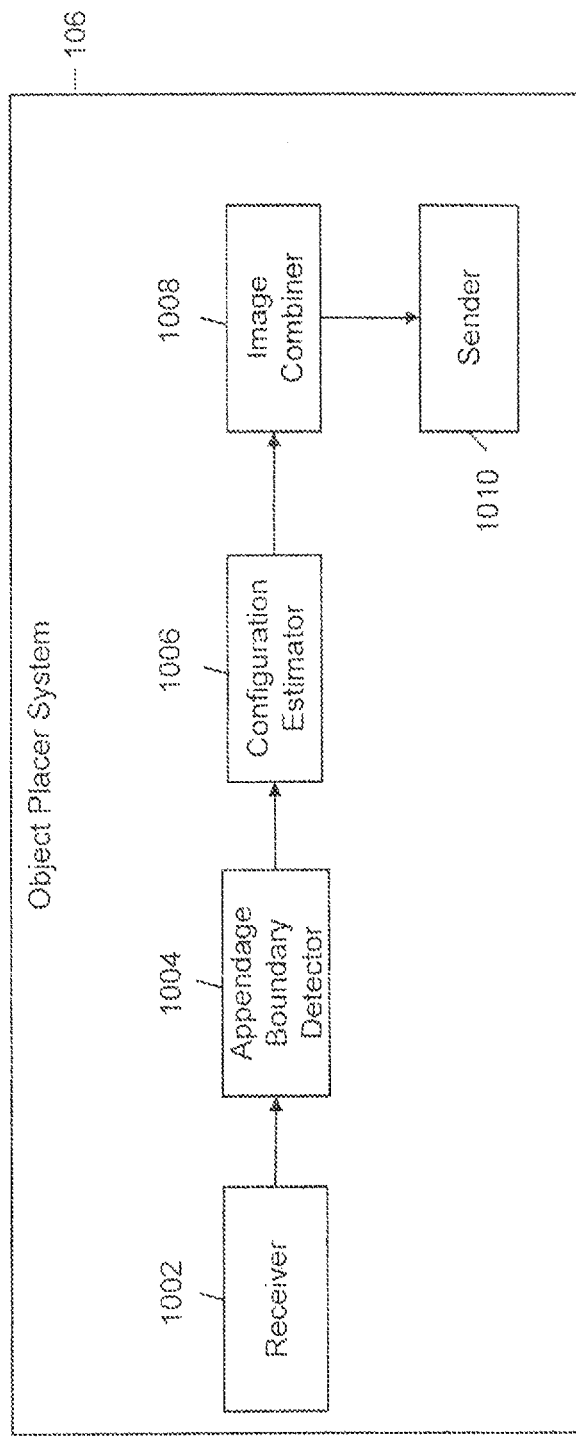
FIG. 10 illustrates a block diagram of an object placer system, in accordance with an embodiment of the invention.

FIG. 10 is a block diagram that illustrates the elements of OPS 106 used to place an image of an object on an image of an appendage, in accordance with various embodiments of the present invention. OPS 106 takes an image of an appendage as input and outputs the image of an object placed on the appendage. FIG. 10 includes Receiver 1002, Appendage Boundary Detector (ABD) 1004, Configuration Estimator (CE) 1006, Image Combiner (IC) 1008 and Sender 1010.

Receiver 1002 receives image 104 from communication device 102 and makes image 104 available to ABD 1004. ABD 1004 is configured to determine the appendage boundaries from the image of the appendage. ABD 1004 is described in more detail in conjunction with FIG. 11. The appendage boundaries are input to CE 1006, which is configured to estimate a configuration of the object. CE 1006 is described in more detail in conjunction with FIG. 13. The estimated configuration is input to IC 1008, which transforms the image of the object and the alpha map according to the estimated configuration, blends the transformed image of the object and the image of the appendage according to the alpha map, and creates an image of the object placed on the appendage as output. The image of the object placed on the appendage is input to Sender 1010, which is configured to send the image of the object placed on the appendage to a destination. In an embodiment of the present invention, the destination is the address from which the image 104 was received.

Figure 11:
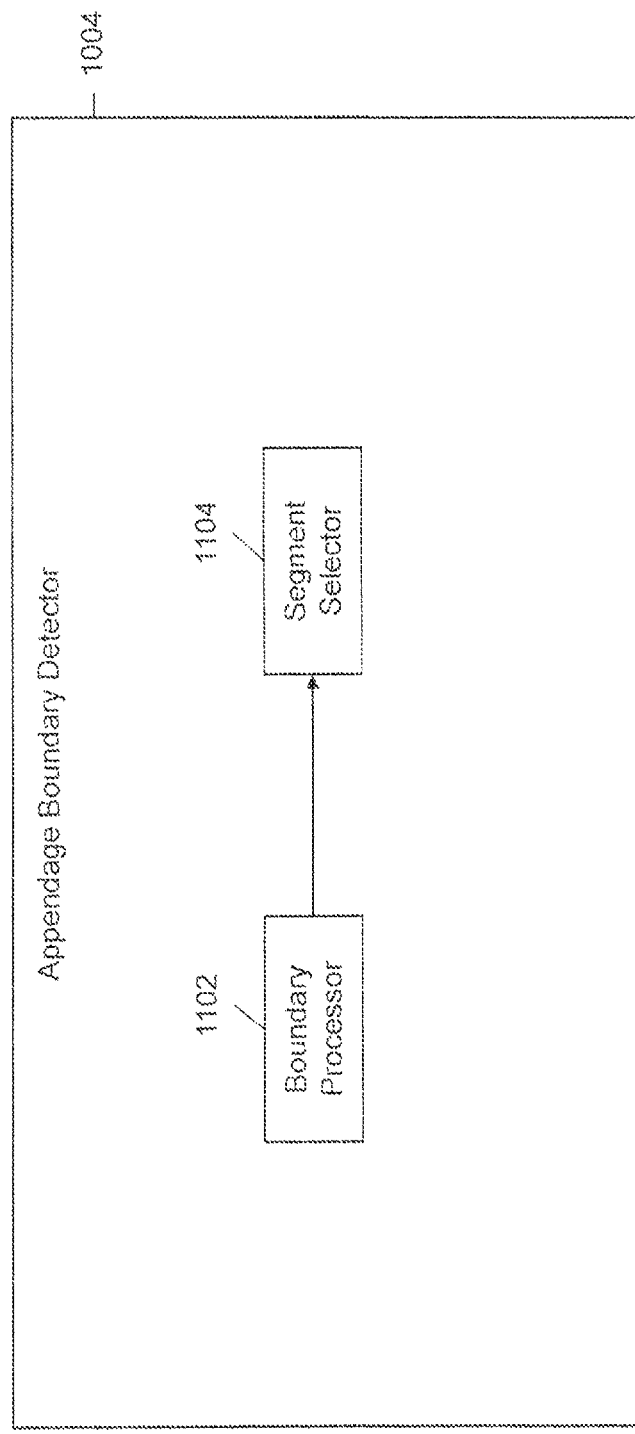
FIG. 11 illustrates a block diagram of an appendage boundary detector, in accordance with an embodiment of the invention.

FIG. 11 is a block diagram illustrating the elements of ABD 1004 used to detect appendage boundaries in image 104. ABD 1004 comprises Boundary Processor (BP) 1102 and Segment Selector (SS) 1104. BP 1102 is configured to take image 104 as input and compute a set of line segments. BP 1102 determines image boundaries in image 104 and extracts one or more line segments from the image boundaries. Further, BP 1102 converts the image boundaries into a set of line segments by finding subsequences of connected pixels in the image boundaries that are straight. SS 1104 selects a pair of line segments as the appendage boundaries and is described in more detail in conjunction with FIG. 12.

Figure 12:
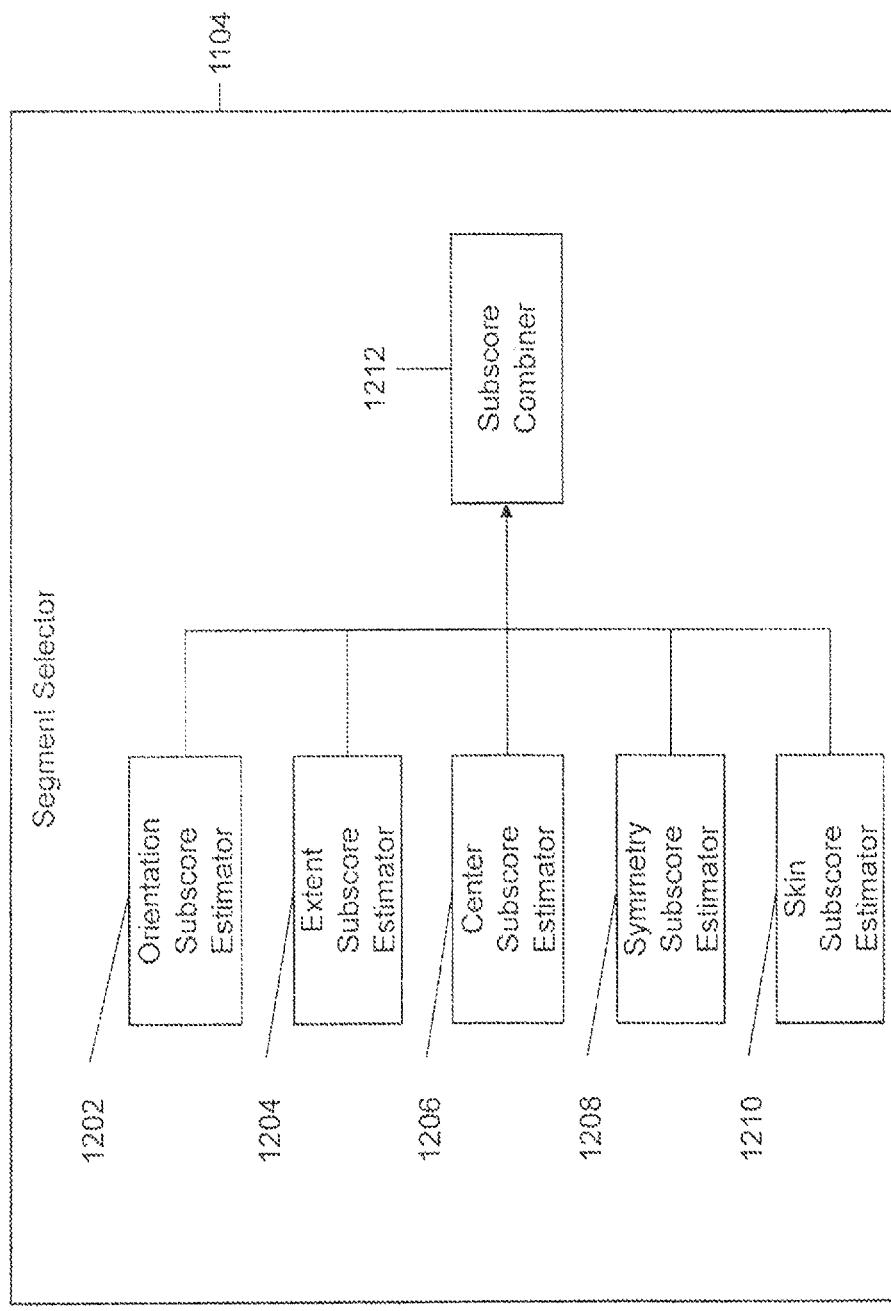
FIG. 12 illustrates a block diagram of a segment selector, in accordance with an embodiment of the invention.

FIG. 12 is a block diagram illustrating the elements of SS 1104 used to select a pair of line segments to become the appendage boundaries. SS 1104 selects one or more pairs of line segments from the output of BP 1102 and computes a score using five subscore estimators and Subscore Combiner 1212. The first subscore estimator is Orientation Subscore Estimator 1202, which is configured to compute an orientation difference between orientations of the two line segments and calculate a function of the orientation difference. The second subscore estimator is Extent Subscore Estimator 1204, which is configured to compute an extent of the object that could be placed on the image of the appendage corresponding to the pair of line segments and calculate a function of the extent of the object and the size of image 104. The third subscore estimator is Center Subscore Estimator 1206, which is configured to compute a location of a center of the pair of line segments and a location of a center of image 104, followed by calculating a function of the center of the pair of line segments and the center of image 104. The fourth subscore estimator is Symmetry Subscore Estimator 1208, which is configured to compute an orientation of a midpoint line segment connecting midpoints of the pair of line segments and an orientation of the object using the pair of line segments. A function of an axis orientation difference between the orientation of the midpoint line segment and the orientation of the object is calculated. The final subscore estimator is Skin Subscore Estimator 1210, which is configured to compute an area of a simple quadrilateral formed by the two line segments and label pixels within the simple quadrilateral as skin-colored that satisfy a skin color model. A function of the number of skin-colored pixels and the area of the simple quadrilateral is computed. Subscore Combiner 1212 then composes the five subscores into a score. SS 1104 then selects the pair of line segments with a highest score as the appendage boundaries.

Figure 13:
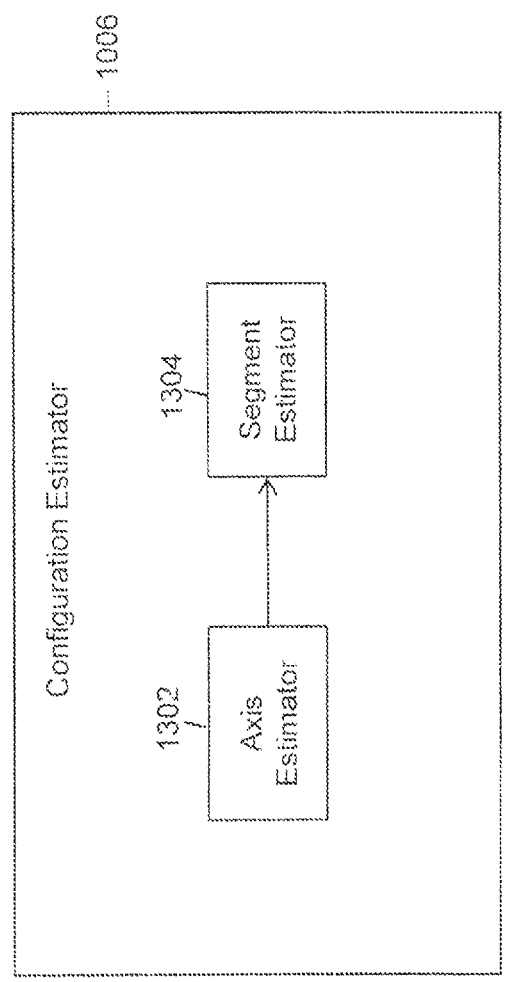
FIG. 13 illustrates a block diagram of a configuration estimator, in accordance with an embodiment of the invention.

FIG. 13 is a block diagram illustrating the elements of CE 1006. CE 1006 comprises Axis Estimator (AE) 1302 and Segment Estimator (SE) 1304. AE 1302 is configured to estimate an object axis for the appendage boundaries by computing a line through the intersection of diagonals of a simple quadrilateral formed from the appendage boundaries, with orientation perpendicular to the average orientation of the appendage boundaries. SE 1304 extracts a line segment from the object axis between the intersection points of the object axis and the appendage boundaries. Note that AE 1302 is also invoked by Extent Subscore Estimator 1204 and Center Subscore Estimator 1206, and that both AE 1302 and SE 1304 are invoked by Symmetry Subscore Estimator 1208.

In accordance with various embodiments of the present invention, the present invention provides a method for placing an image of an object on an image of a human appendage. The present invention estimates the configuration of the object necessary to place it on the appendage in a natural and realistic-looking manner. The method first extracts image boundaries from the image of the appendage. The subscores are the results of functions applied to measurements of one or more properties of one or more pairs of line segments from the extracted image boundaries. The appendage boundaries are selected based on the scores formed from combining the computed subscores. The advantage of the method is that it saves the time and cost of a human operator to perform the same tasks.

The system for placing an image of an object on an image of an appendage, as described in the present invention or any of its components, may be embodied in the form of a computer program product for use with a computer system. The computer program product has a computer-usable medium having a computer-readable code embodied therein to place the image of the object on the image of the appendage. Typical examples of a computer system include a general-purpose computer, a programmed microprocessor, a micro-controller, a peripheral integrated circuit element, and other devices or arrangements of devices capable of implementing the steps that constitute the method of the present invention.

The computer system typically comprises a computer, an input device, and a display unit. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard disk drive or a removable storage drive, such as a floppy disk drive, an optical disk drive, and the like. The storage device may also be other similar means of loading computer programs or other instructions into the computer system. The computer system also includes a communication unit. The communication unit enables the computer to connect to other databases and the Internet through an Input/Output (I/O) interface, enabling transfer and reception of data from other databases. The communication unit may include a modem, an Ethernet card or any other similar device which enables the computer system to connect to databases and networks such as LAN, MAN, WAN and the Internet. The computer system facilitates inputs from a user through an input device, accessible to the system through an I/O interface.

The computer system executes a set of instructions stored in one or more storage elements to process input data. The storage elements may also hold data or other information as desired. The storage element may be in the form of an information source or a physical memory element present in the processing machine.

The programmable instructions may include various commands that instruct the processing machine to perform specific tasks such as the steps that constitute the method of the present invention. The method and systems described can also be implemented using only software programming or hardware or by a varying combination of the two techniques. The present invention is independent of the programming language used and the operating system in the computers. The instructions for the invention can be written in all programming languages including, but not limited to, 'C++', 'Visual C++' and 'Visual Basic'. Further, the software may be in the form of a collection of separate programs, a program module with a large program or a portion of a program module, as described in the present invention. The software may also include modular programming in the form of object-oriented programming. The processing of input data by the processing machine may be in response to user commands, results of previous processing or a request made by another processing machine. The invention can also be implemented in all operating systems and platforms including, but not limited to, 'Unix', 'DOS', and 'Linux'.

The programmable instructions can be stored and transmitted on computer-readable medium. The programmable instructions can also be transmitted by data signals across a carrier wave. The present invention can also be embodied in a computer program product comprising a computer-readable medium, the product capable of implementing the methods and systems above or the numerous possible variations thereof.

While various embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

The invention claimed is:

1. A non-transitory computer readable storage medium including instructions stored thereon which, when executed by a processor, cause the processor to perform the steps of:
   obtaining a first image of a user from a mobile computing device;
   obtaining a second image of at least one portion of an object;
   identifying a dimension of at least one portion of the user in the first image;
   generating a transformation based on at least one of a rotation, a scaling, or a translation to be applied to the second image based at least in part upon the dimension of the at least one portion of the user, the at least one of the rotation, the scaling, or the translation calculated at least in part by:
      determining an intersection point of diagonals of a shape formed by the one or more dimensions;
      determining an axis of the at least one portion of the user through the intersection point of the diagonals with an orientation perpendicular to an average orientation of the one or more dimensions; and
      determining a segment of the axis located between the one or more dimensions as the rotation, the scaling, or the translation;
   generating a third image based on the first image and the transformation of the second image, the third image including the at least one portion of the object applied to the at least one portion of the user; and
   providing the third image for display on the mobile computing device.

2. The non-transitory computer readable medium according to claim 1, wherein identifying a dimension of the at least one portion of the user in the first image comprises:
   determining a plurality of image boundaries of the at least one portion of the user;
   determining a plurality of line segments from the plurality of image boundaries; and
   selecting a pair of line segments from the plurality of line segments based on a score calculated for the pair of line segments.

3. The non-transitory computer readable medium according to claim 2, wherein for each pair of line segments from the plurality of line segments, the score is calculated by obtaining one or more subscores for the pair of line segments, and determining a score for the pair of line segments from the one or more subscores.

4. The non-transitory computer readable medium according to claim 3 wherein the one or more subscores include at least one of an orientation subscore, an extent subscore, a center subscore, a symmetry subscore, or a skin subscore.

5. A computer-implemented method comprising:
   obtaining a first image of a user;
   obtaining a dimension of at least one portion of the user;
   obtaining a transformation of a second image, the transformation generated based on at least one of a rotation, a scaling, or a translation to be applied to the second image based at least in part on the dimension of the at least one portion of the user, the second image including a representation of at least one portion of an object, the at least one of the rotation, the scaling, or the translation calculated at least in part by:
      determining an intersection point of diagonals of a shape formed by the one or more dimensions;
      determining an axis of the at least one portion of the user through the intersection point of the diagonals with an orientation perpendicular to an average orientation of the one or more dimensions; and
      determining a segment of the axis located between the one or more dimensions as the rotation, the scaling, or the translation; and
   providing a third image from the first image and the transformation of the second image, the third image including the at least one portion of the object applied to the at least one portion of the user.

6. The computer-implemented method according to claim 5, wherein obtaining a dimension of the at least one portion of the user in the first image comprises:
   determining a plurality of image boundaries of the at least one portion of the user;
   determining a plurality of line segments from the plurality of image boundaries; and
   selecting a pair of line segments from the plurality of line segments based on a score calculated for the pair of line segments.

7. The computer-implemented method according to claim 5, wherein for each pair of line segments from the plurality of line segments, the score is calculated by obtaining one or more subscores for the pair of line segments, and determining a score for the pair of line segments from the one or more subscores.

8. The computer-implemented method according to claim 7 wherein the one or more subscores include at least one of an orientation subscore, an extent subscore, a center subscore, a symmetry subscore, or a skin subscore.

9. The computer-implemented method according to claim 6, wherein the plurality of image boundaries in the first image is determined using edge detection.

10. The computer-implemented method according to claim 5, wherein the object is one of a physical object or a virtual object.

11. A computing device comprising:
   a display component;
   an image capturing component;
   at least one processor; and
   a memory device including instructions that, when executed by the at least one processor, cause the computing device to:
      obtain a first image of a user;
      obtain a dimension of at least one portion of the user;
      obtain a transformation of a second image based, the transformation generated based on at least one of a rotation, a scaling, or a translation to be applied to the second image at least in part on the dimension of the at least one portion of the user, the second image including a representation of at least one portion of an object, the at least one of the rotation, the scaling, or the translation calculated at least in part by:
         determining an intersection point of diagonals of a shape formed by the one or more dimensions;
         determining an axis of the at least one portion of the user through the intersection point of the diagonals with an orientation perpendicular to an average orientation of the one or more dimensions; and
         determining a segment of the axis located between the one or more dimensions as the rotation, the scaling, or the translation; and
      provide a third image from the first image and the transformation of the second image, the third image including the at least one portion of the object applied to the at least one portion of the user.

12. The computing device according to claim 11, wherein obtaining a dimension of the at least one portion of the user in the first image comprises:
   determining a plurality of image boundaries of the at least one portion of the user;
   determining a plurality of line segments from the plurality of image boundaries; and
   selecting a pair of line segments from the plurality of line segments based on a score calculated for the pair of line segments.

13. The computing device according to claim 11, wherein for each pair of line segments from the plurality of line segments, the score is calculated by obtaining one or more subscores for the pair of line segments, and determining a score for the pair of line segments from the one or more subscores.

14. The computing device according to claim 13, wherein the one or more subscores include at least one of an orientation subscore, an extent subscore, a center subscore, a symmetry subscore, or a skin subscore.

15. The computing device according to claim 12, wherein the plurality of image boundaries in the first image is determined using edge detection.

16. The computing device according to claim 11, wherein the object is one of a physical object or a virtual object.

* * * * *